United States Patent

[11] 3,604,738

| [72] | Inventor | Daton William Alpaugh |
| | | Rochester, N.Y. |
| [21] | Appl. No. | 739,291 |
| [22] | Filed | June 24, 1968 |
| [45] | Patented | Sept. 14, 1971 |
| [73] | Assignee | Eastman Kodak Company |
| | | Rochester, N.Y. |

[54] METHOD OF ATTACHING A THIN, FLAT, RESILIENTLY DEFORMABLE RING TO A MATING COMPONENT AND PRODUCT
7 Claims, 10 Drawing Figs.

[52] U.S. Cl. .................................................. 287/20.3,
29/235, 29/453, 85/52, 93/94 FC, 93/94 M
[51] Int. Cl. ....................................................... B23p 11/02,
B23p 19/02, F16b 43/02
[50] Field of Search............................................ 29/446,
450, 451, 453, 525, 209, 210, 235; 93/94 FC, 94 M; 85/52; 287/20.3, 110

[56] References Cited
UNITED STATES PATENTS

| 417,446 | 12/1889 | Sands .......................... | 29/235 X |
| 801,683 | 10/1905 | Penfold ........................ | 29/235 X |
| 3,146,748 | 9/1964 | Knocke ........................ | 72/336 |
| 3,393,439 | 7/1968 | Shriver......................... | 29/208 F |
| 3,460,231 | 8/1969 | Illgen............................. | 29/208 F |
| 1,752,982 | 4/1930 | Herold .......................... | 93/94 OFC |
| 2,263,815 | 11/1941 | Northup........................ | 29/451 |
| 2,322,363 | 6/1943 | James............................ | 29/210 X |
| 2,357,139 | 8/1944 | Seme............................. | 29/451 X |
| 2,591,203 | 4/1952 | Schmalz........................ | 29/451 X |
| 2,603,017 | 7/1952 | Merrill .......................... | 29/525 X |
| 2,633,758 | 4/1953 | Hobson ........................ | 29/450 X |
| 2,848,746 | 8/1958 | Thielen......................... | 29/451 |
| 2,956,476 | 10/1960 | Rupert.......................... | 29/451 X |
| 3,330,331 | 7/1967 | Duckwall...................... | 29/453 X |
| 3,487,529 | 1/1970 | Serio............................. | 29/451 X |

*Primary Examiner*—Wayne A. Morse, Jr.
*Attorneys*—Robert W. Hampton and William F. Delaney, Jr.

ABSTRACT: A method of attaching a thin, flat, resiliently deformable ring with an inner edge defining an inside dimension and an outer edge defining a perimeter to a component having a mating wall with a configuration similar to that of a first one of the edges of the ring, and having a contact surface for engaging a surface of a ring when attached to the component, The flat ring is formed into a dished shape such that the inside dimension is increased and the perimeter is reduced, and the dished ring is placed on the mating component with the first edge of the ring in contact with the contact surface and with the peripheral portion of the ring opposite the contacted first edge extending away from the contact surface. The outer edge of the ring is confined as pressure is then exerted on the opposite periphery of the ring to snap that opposite periphery past the contacted first edge to reverse the direction of concavity of the ring and to bring a surface of the ring into contact with the contact surface as the inside dimension is reduced and the outside perimeter is enlarged to form an interference fit with the mating wall of the component.

PATENTED SEP 14 1971 3,604,738

D. WILLIAM ALPAUGH
INVENTOR.
BY William F. Delaney Jr.
Robert W. Hampton
ATTORNEYS

METHOD OF ATTACHING A THIN, FLAT, RESILIENTLY DEFORMABLE RING TO A MATING COMPONENT AND PRODUCT

BACKGROUND OF THE INVENTION

This invention relates to an improved method of attaching a thin, flat, resiliently deformable ring to a mating component.

Thin, flat rings have many practical applications, such as for retaining or for decorative purposes. For example, such rings can be used to secure lens elements in lens mounts. An example of the use of such rings for decorative purposes is on the exterior portion of a camera lens mount.

Regardless of the purpose for which a thin, flat ring is intended, they are usually attached to a support member in a well-known manner, such as by threaded screws or by adhesives. Attachment by presently known methods can be relatively expensive because of the assembly time cost and because of necessary additional materials.

SUMMARY OF THE INVENTION

It is an object of this invention to provide an improved method for attaching a thin, flat, resiliently deformable ring to a mating component.

According to one embodiment of this invention a thin, flat, resiliently deformable ring with an inner edge defining an inside dimension and an outer edge defining a perimeter is attached to a component which defines a mating wall having a configuration similar to one of the edges of the ring and having a contact surface for engaging a surface of the ring when the ring is attached to the component. One preferred method of attaching the ring comprises the steps of: forming the flat, resiliently deformable ring so that it has a dished shape such that the inner dimension is increased and the outer perimeter is decreased to permit the location of the ring in cooperative relation with the mating wall of the component; placing the dished-shaped ring on the component with a first edge in cooperative relation with the mating wall with one edge of the ring adjacent to the contact surface and with the ring oriented such at its peripheral portion opposite said contacted edge extends away from the contact surface; and then confining the outer edge of the ring as pressure is exerted on the opposite periphery of the ring to snap the opposite periphery axially past and overcenter relative to said contacted edge, thereby reversing the direction of concavity of the ring to bring a surface of the ring into engagement with the contact surface, as the inner dimension is decreased and the periphery is increased to form an interference fit with the mating wall of the component.

The term "ring" is intended to include any band in the form of an endless closed loop or a major portion of such a loop defining an inner radial surface or edge and an outer radial surface or edge. Such a closed loop need not be circular although that is the preferred shape. The ring could have any configuration so long as the ring retains a high degree of elasticity when the ring is deformed in the manner described herein. For example the ring could be hexagonal, rather than circular as described in the disclosed embodiments. Moreover, a portion of the ring could be eliminated in the practice of this invention, if the ends of the remaining portion are confined in a manner to provide an effect substantially equivalent to which would have otherwise been provided by the eliminated portion of the ring.

DETAILED DESCRIPTION OF THE INVENTION

Figure 1:
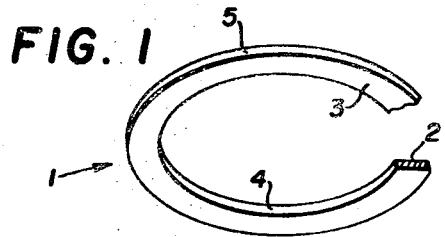
FIG. 1 is a perspective view of a thin, flat, resiliently deformable ring adapted to be attached to a mating component according to this invention.

In FIG. 1 a ring 1 is shown, which has been blanked and perforated from a thin, flat, resiliently deformable material, such as for example spring steel or annealed steel. The ring 1 is shown having two flat radial surfaces 2 and 3 with an inner axial surface or edge 4 and an outer axial surface or edge 5. The edges 4 and 5 are shown in FIG. 1 as cylindrical surfaces because the ring has been square cut in this embodiment. However, the shape of the edges is not significant. For example, the ring may be blanked and perforated with canted or beveled edges which may be sharp or blunt.

The axial thickness of the ring 1 should be considerably smaller than the radial width between the inner and outer edges. For example, the ring may be cut from an annealed steel blank 0.010 inch thick to provide an outside diameter of 1.030 inches and an inside diameter 0.895 inch.

Figure 2:
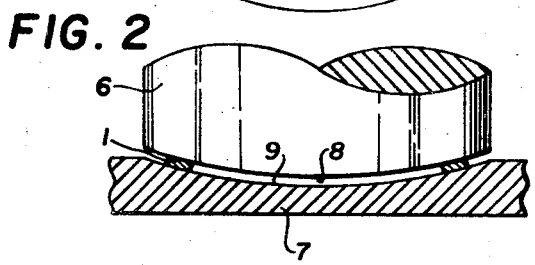
FIG. 2 is a cross-sectional view of the ring in FIG. 1 being formed in a forming punch and die with the punch being shown in elevation.

Prior to assembly with a mating component the flat ring in FIG. 1 is formed into a dished shape which may be accomplished, for example, by pressing the ring 1 between a forming punch 6 and die 7, as illustrated in FIG. 2. The forming punch 6 and die 7 have spherical forming surfaces 8 and 9 with radii of curvature greater than the radius of the outside diameter of the ring.

Figure 3:
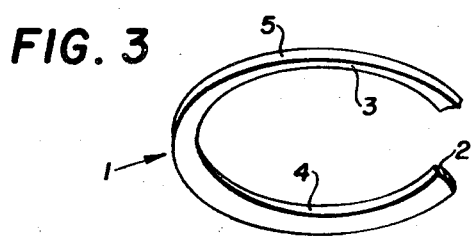
FIG. 3 is a perspective view of the ring after it has been formed into a dished shape.

Following the forming step illustrated in FIG. 2, the ring 1 remains deformed in a dished shape, as seen in FIG. 3, with the diameter of its outer edge reduced and with the diameter of its inner edge 4 increased from its original dimensions. For example, if the ring in FIG. 1 with the dimensions stated above is formed with a spherical punch having a radius of curvature 1.250 inches, the outer edge diameter of the ring will be decreased to 1.010 inches and the inner edge diameter will be increased to 0,925 inch. These last two diameter dimensions will vary somewhat within approximately 0.005 to 0.007 inch. The flat surfaces 2 and 3 of such a ring will have been deformed to a spherical surface deflected from their original flat planes by approximately 32° to 45°

The dished ring in this embodiment of the invention in FIG. 3 is then placed within a cylindrical aperture defined by a mating wall 11 of component 10 with a radius of curvature slightly larger than that of the outside diameter of the dished ring. The outside edge 5 of the ring rests on a contact surface 12 of the mating component 10 with the ring oriented such that the inner peripheral portion of the ring opposite the contacted edge 5 extends away from the contact surface 12.

Figure 4A:
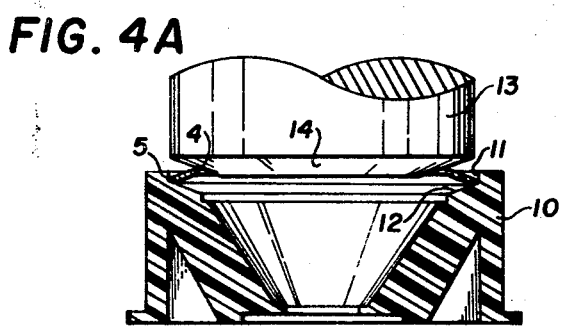
FIG. 4A is a sectional view of the dished ring with its outer edge in contact with a mating component and with the inner edge of the ring in contact with an assembly punch shown in elevation.
Figure 5A:
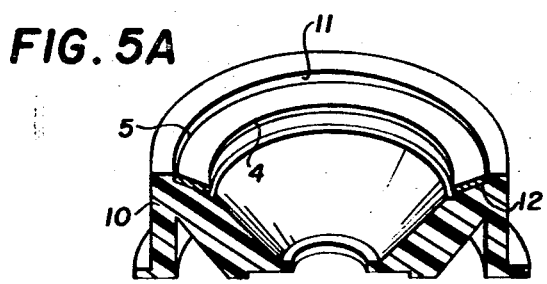
FIGS. 5A and 5B illustrate the dished ring in assembled relation with the mating components shown in FIGS. 4A and 4B, respectively.

With the ring located on the mating component 10 as seen in FIG. 4A, pressure is exerted on the inner periphery of the ring opposite the contacted edge 5 of the ring by means of an assembly punch 13 which is illustrated as having a frustoconical surface 14 adapted to engage the inside edge 4 of the ring. The assembly punch 13 is pressed in the direction of the concavity of the ring to snap the inside periphery of the ring past the outside edge 5 to reverse the direction of concavity of the ring as seen in FIG. 5A. This reversal of the ring's concavity causes the inside diameter of the ring to decrease and the outside diameter to increase as the ring expands during this snap reversal. The contact surface 12 is adapted to engage a surface 3 of the ring and limit the distance of travel of the inside periphery of the ring after it snaps past the contacted edge 5. Consequently, the increased outside diameter of the ring is not permitted to return to the size it had assumed in the deformed dished condition, and therefore it exerts considerable radial pressure on the cylindrical wall 11 of the mating component 10 to form an interference fit with that wall. For example, if the contact surface 7 holds the snapped ring at an angle of deflection of approximately 15°, the outside diameter will have expanded to approximately 1.028 inches.

Figure 4B:
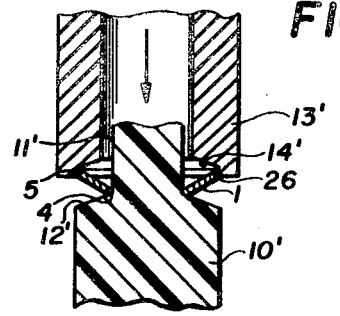
FIG. 4B is a sectional view of the dished ring with its inside edge in contact with a mating component and with the perimeter of the ring in contact with and confined by an assembly punch.
Figure 5B:
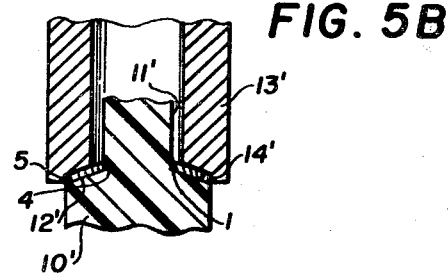

As seen in FIG. 4B, the dished ring seen in FIG. 3 is located on a mating component 10' with the inside diameter 4 of the ring 1 confined by a cylindrical wall 11' and resting on a contact surface 12'. The ring 1 is oriented with its concavity directed away from the contact surface 12 such that the outside periphery of the ring opposite the contacted edge 4 extends away from the contact surface. An assembly punch 13' having a frustoconical surface 14' forming an angle with a cylindrical wall 26 which confines the outside periphery of the ring as surface 14 exerts pressure in a direction opposite to the concavity of the ring. The pressure exerted by the assembly punch 13' causes the outside periphery of the ring to snap past its inside contacted edge 4 which is held in place by the contact surface 12'. The ring is thus caused to reverse the direction of its concavity and to press a surface 2 against the contact surface 12' which prevents the ring from returning to its deformed dished-shape dimensions in its reversed condition. Consequently, the decreased dimension of the inside diameter is maintained to form an interference fit with the confining wall 11'. Thus, the steps seen in FIGS. 4A and 4B differ only in that different edges of the rig are confined to form an interference fit.

Figure 6:
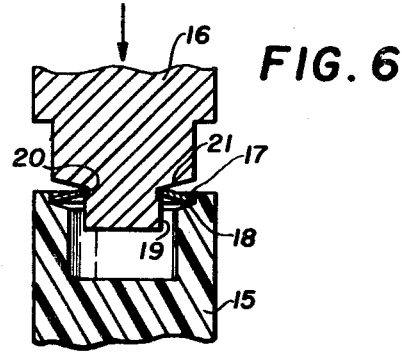
FIG. 6 is a cross-sectional view of two mating components in contact with the inner and outer edges of the dished ring, prior to their being attached to the ring.
Figure 7:
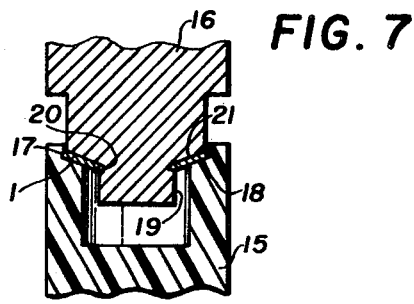
FIG. 7 is a cross-sectional view similar to FIG. 6 after the mating components have been attached to the ring.

As seen in FIGS. 6 and 7 the method described above can be employed to connect two components each adapted to mate with one of the axial edges of a thin ring. In FIG. 6 a dished ring 1, as shown in FIG. 3, is located between two mating components 15 and 16 with the outside edge 5 of the ring confined by a wall 17 of the component 15 and in contact with a contact surface 18 of component 15. The inside edge 4 of the ring is confined by a wall 19 which may define a groove 20, as seen in FIGS. 6 and 7. The inside edge 4 of the ring is in contact with a contact surface 21 of the component 16. The ring is oriented such that it extends away from each of the contact surfaces 18 and 21. When the components 15 and 16 are forced towards each other axially, the ring is caused to toggle or snap such that its direction of concavity is reversed as its outer diameter 5 is increased and its inner edge 4 diameter is decreased. Consequently, as seen in FIG. 7 the outside edge 5 of the ring is caused to exert radial force on the confining wall 17 of the component 15, and the inside edge 4 of the ring is caused to expand into the groove 20. If no such groove were provided, the inside edge 4 of the ring would exert pressure on the confining wall 19 to form an interference fit. Thus, the ring forms a means of securing the components 15 and 16 in a fixed relation, or in a relatively rotatable relation, as seen in FIG. 7.

Figure 8:
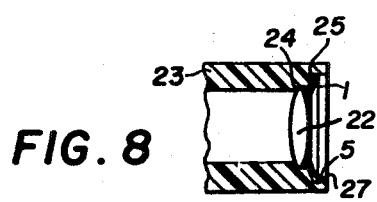
FIG. 8 is a cross-sectional view of a lens element mounted on a lens mount by a retainer ring attached to the lens mount according to this invention.

FIG. 8 illustrates another example of the use of this invention to secure two members to each other. In this example the ring secures a lens element 22 to a lens mount 23. The lens 22 is positioned against a retaining wall 24 of lens mount 23. The ring 1 has been located against a contact surface 25 provided on the lens mount 23 such that the outside edge 5 of the ring is confined by a surface 27 provided on lens mount 23. The ring has been snapped against the lens element 22 to reverse the direction of concavity of the ring 1 and form an interference fit between the outside edge 5 of the ring and the confining surface 27.

The invention has been described in detail with particular reference to preferred embodiments thereof, but it will be understood that variations and modifications can be effected within the spirit and scope of the invention as described hereinabove and as defined in the appended claims.

I claim:

1. A method of attaching a thin, flat, resiliently deformable ring having an outer edge defining an outer dimension, an opposite inner edge defining an inner dimension, and opposite surfaces extending between said edges, to a component defining a mating wall having a configuration complimentary to that of a first one of the edges of the ring and a contact surface extending from a juncture with the mating wall for engaging one surface of the ring when the ring is attached to the component, said method comprising the steps of:

forming the ring into a dished shape such that the inner dimension is increased and the outer dimension is decreased to permit the location of the ring with the first edge adjacent the mating wall of the component;

placing the dished ring on the component with the first edge against the contact surface adjacent the juncture of the contact surface and the mating wall, said ring being oriented such that the surfaces of the ring extend away from the contact surface; and forcing said ring towards the contact surface to snap said opposite edge past the first edge, thereby reversing the direction of the concavity of the ring to form an interference fit between the first edge of the ring and the mating wall of the component to attach the ring to the component.

2. A method of attaching a thin, flat, resiliently deformable ring having an outer peripheral edge defining an outer dimension, an inner peripheral edge, and opposite surfaces extending between said edges, to a mating component defining a cavity wall with a configuration complimentary to that of the outer peripheral edge of the ring and with a dimension slightly less than the outer dimension of the ring said mating component having a contact surface extending from a juncture with the cavity wall toward the cavity for engaging one surface of the ring when the ring is attached to the component, said method comprising the steps of:

forming the flat ring into a dished shape to decrease its outer dimension so that the dished ring fits within the cavity;

placing the dished ring in the cavity with the outer edge of the ring on the contact surface adjacent the juncture of the contact surface and the cavity wall, and with the ring oriented such that is concavity is directed toward the contact surface; and forcing the ring in the direction of its concavity to snap the inner peripheral edge past the outer peripheral edge, thereby reversing the direction of concavity of the ring to attach the ring to the component by forming an interference fit between the outer edge of the ring and the cavity wall of the mating component.

3. A method of attaching a thin, flat, resiliently deformable ring having an inner edge defining an inner dimension, an outer edge, and opposite surfaces extending between said edges, to a mating component defining a protruding member having a mating surface with a configuration complimentary to that of the inner edge of the ring and a dimension slightly greater than the inner dimension of the ring, and a contact surface extending from a juncture with the mating surface for engaging one surface of the ring when the ring is attached to the component, said method comprising the steps of:

forming the flat ring into a dished shape to increase the inner dimension of the ring so that the dished ring fits around the mating surface of the protruding member;

placing the dished ring on the component with the inner edge of the ring on the contact surface adjacent the juncture of the contact surface and the mating surface of the protruding member, the ring being oriented such that the outer edge of the ring extends away from the contact surface; and forcing the ring toward the contact surface to snap the outer edge over center past the inner edge, thereby reversing the direction of concavity of the ring to bring one surface of the ring into engagement with the contact surface and to form an interference fit between the inner edge of the ring and the protruding member, thereby attaching the ring to the member.

4. A method of attaching a first component to a second component defining a cavity for receiving the first component, means for supporting the first component within the cavity, a mating wall extending around and defining part of the cavity, and a contact surface extending from a juncture with the mating wall toward the cavity, said method comprising the steps of:

forming a thin, flat, resiliently deformable ring having inner and outer peripheral edges, and opposite surfaces extending between said edges, into a dished shape to decrease the size of the outer peripheral edge, such that the dished ring fits within the cavity;

positioning the first component on said supporting means in the cavity of the second component;

positioning the dished ring in the cavity with the outer edge of the ring on the contact surface adjacent to the juncture of the mating wall and the contact surface, with the ring oriented such that its concavity is directed toward the first component; and exerting pressure on the inner periphery of the ring in the direction of its concavity to snap the inner peripheral edge past the outer peripheral edge, thereby reversing the direction of concavity of the ring to bring the ring into engagement with the first component as the outer peripheral edge is enlarged to form an interference fit with the mating wall of the second component, to thereby attach the first component to the second component.

5. A method of attaching a lens element to a lens mount defining a cavity for receiving the lens element, a retaining wall for supporting the lens element within the cavity, a mating wall extending around and defining part of the cavity, and a contact surface extending from a juncture with the mating wall toward the cavity, said method comprising the steps of:

forming a thin, flat, resiliently deformable ring having an inner periphery and an outer peripheral edge, and opposite surfaces extending between said periphery and said peripheral edge, into a dished shape to decrease the size of the outer peripheral edge, such that the dished ring fits within the cavity;

positioning the lens element on said retaining wall in the cavity of the lens mount;

positioning the dished ring in the cavity with the outer edge of the ring on the contact surface adjacent to the juncture of the mating wall and the contact surface, with the ring oriented such that its concavity is directed toward the lens element; and forcing the inner periphery of the ring in the direction of its concavity to snap the inner periphery past the outer peripheral edge, thereby reversing the direction of concavity of the ring to bring the ring into engagement with the lens element as the outer peripheral edge is enlarged to form an interference fit with the mating wall of the lens mount, to thereby attach the lens element to the lens mount.

6. A method of attaching a first component comprising a protruding member to a second component comprising a hollowed portion for receiving the protruding member, by means of a third component comprising a thin, flat, resiliently deformable ring having first and second opposite surfaces extending between an inner edge defining an inner dimension and an outer edge defining an outer dimension.

the protruding member of the first component having a mating surface with a configuration complimentary to the inner edge of the ring, and a contact surface extending from a juncture with the mating surface and adapted to engage the first surface of the ring; and the hollowed portion of the second component including a mating wall with a configuration complimentary to the outer edge of the ring, and a contact surface extending from the mating wall toward the hollowed portion and adapted to engage the second surface of the ring when the three components are attached; said method comprising the steps of:

forming the flat ring into a dished shape to increase the inner dimension of the ring so that the ring fits around the protruding member, and to decrease the outer dimension of the ring so that the ring fits within the hollowed portion;

placing the protruding member through the ring so that the inner edge of the ring contacts the contact surface of the protruding member, and placing the ring in the hollowed portion with the outer edge of the ring on the contact surface of the second component adjacent to the juncture of the mating wall and the contact surface, the ring being oriented so that its concavity is direct toward the latter contact surface an away from the contact surface of the protruding member; and forcing the protruding member of the first component into the hollowed portion of the second component, to snap the inner edge of the ring past the outer edge to reverse the direction of concavity of the ring, causing the respective contact surfaces of the first and second components to contact the opposite surfaces of the ring, and urging the inner edge of the ring into retaining engagement with the mating surface of the first component and the outer edge of the ring into retaining engagement with the mating wall of the second component, to attach the three components together.

7. A product made according to the process defined in claim 1.